US008363227B2

(12) United States Patent
Aoki

(10) Patent No.: US 8,363,227 B2
(45) Date of Patent: Jan. 29, 2013

(54) MEASUREMENT APPARATUS AND METHOD OF MANUFACTURING OPTICAL SYSTEM

(75) Inventor: Eiji Aoki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 386 days.

(21) Appl. No.: 12/836,218

(22) Filed: Jul. 14, 2010

(65) Prior Publication Data

US 2011/0013196 A1    Jan. 20, 2011

(30) Foreign Application Priority Data

Jul. 15, 2009  (JP) ................................. 2009-167261

(51) Int. Cl.
 *G01B 11/02*    (2006.01)
(52) U.S. Cl. ......... 356/512; 356/497; 356/498; 356/495
(58) Field of Classification Search .................. 356/512, 356/497, 495, 498
See application file for complete search history.

(56) References Cited

U.S. PATENT DOCUMENTS

2002/0176090 A1* 11/2002 Ohsaki et al. .................. 356/512
2004/0150834 A1*  8/2004 Sommargren et al. ........ 356/521

FOREIGN PATENT DOCUMENTS

JP    5-223537 A    8/1993

* cited by examiner

*Primary Examiner* — Tarifur Chowdhury
*Assistant Examiner* — Sunghee Y Gray
(74) *Attorney, Agent, or Firm* — Rossi, Kimms & McDowell LLP

(57) ABSTRACT

The present invention provides a measurement apparatus which measures a wavefront of light traveling from a member to be measured, the apparatus including a first reference surface, a second reference surface configured to function as a reference surface for the first reference surface, an optical system configured to form a first interference pattern of light traveling from the member to be measured and light traveling from the first reference surface, and a second interference pattern of light traveling from the first reference surface and light traveling from the second reference surface, a detection unit configured to detect the first interference pattern and the second interference pattern, respectively, and a calculation unit configured to calculate a wavefront of light traveling from the member to be measured based on the first interference pattern and the second interference pattern detected by the detection unit.

6 Claims, 4 Drawing Sheets

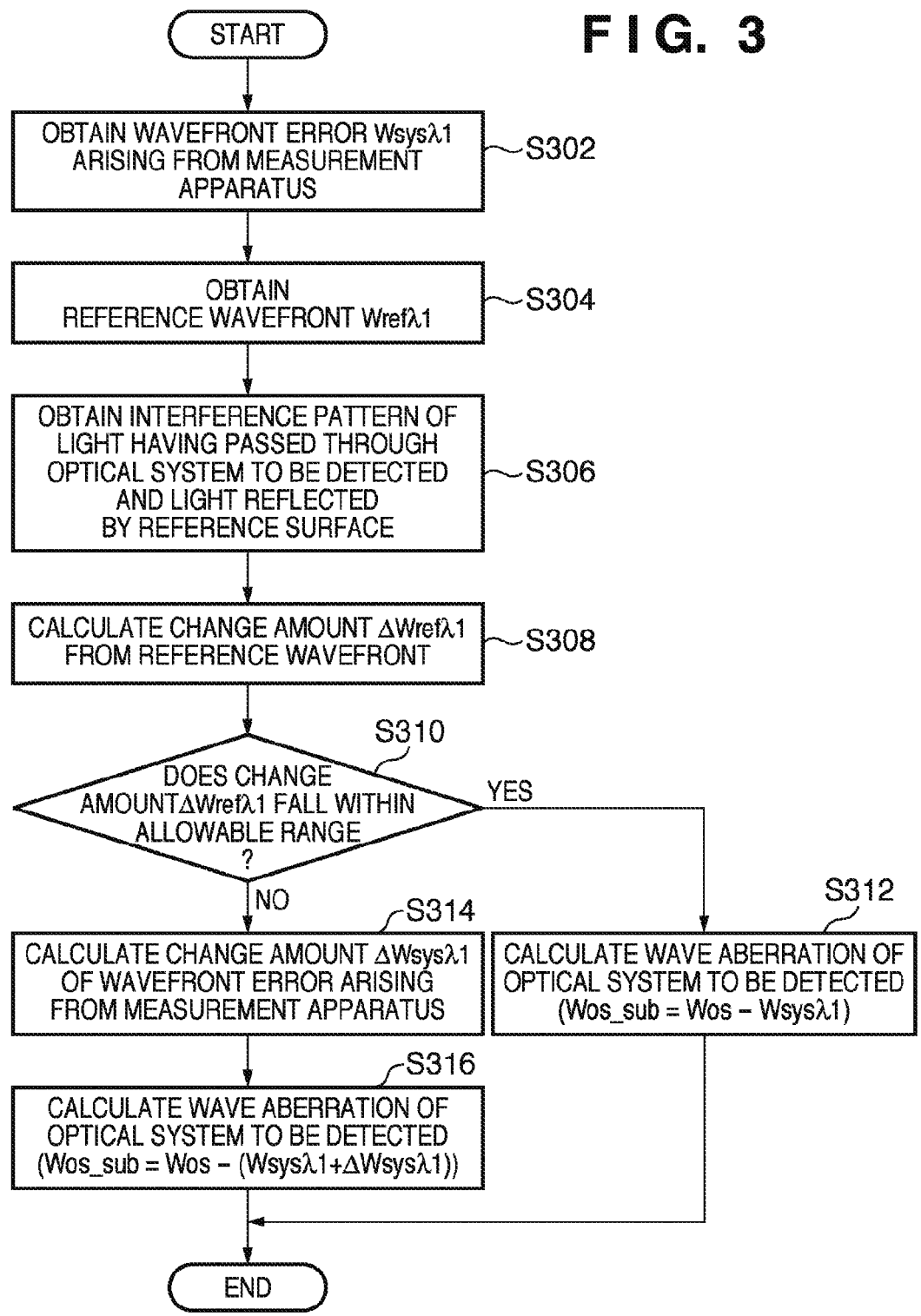

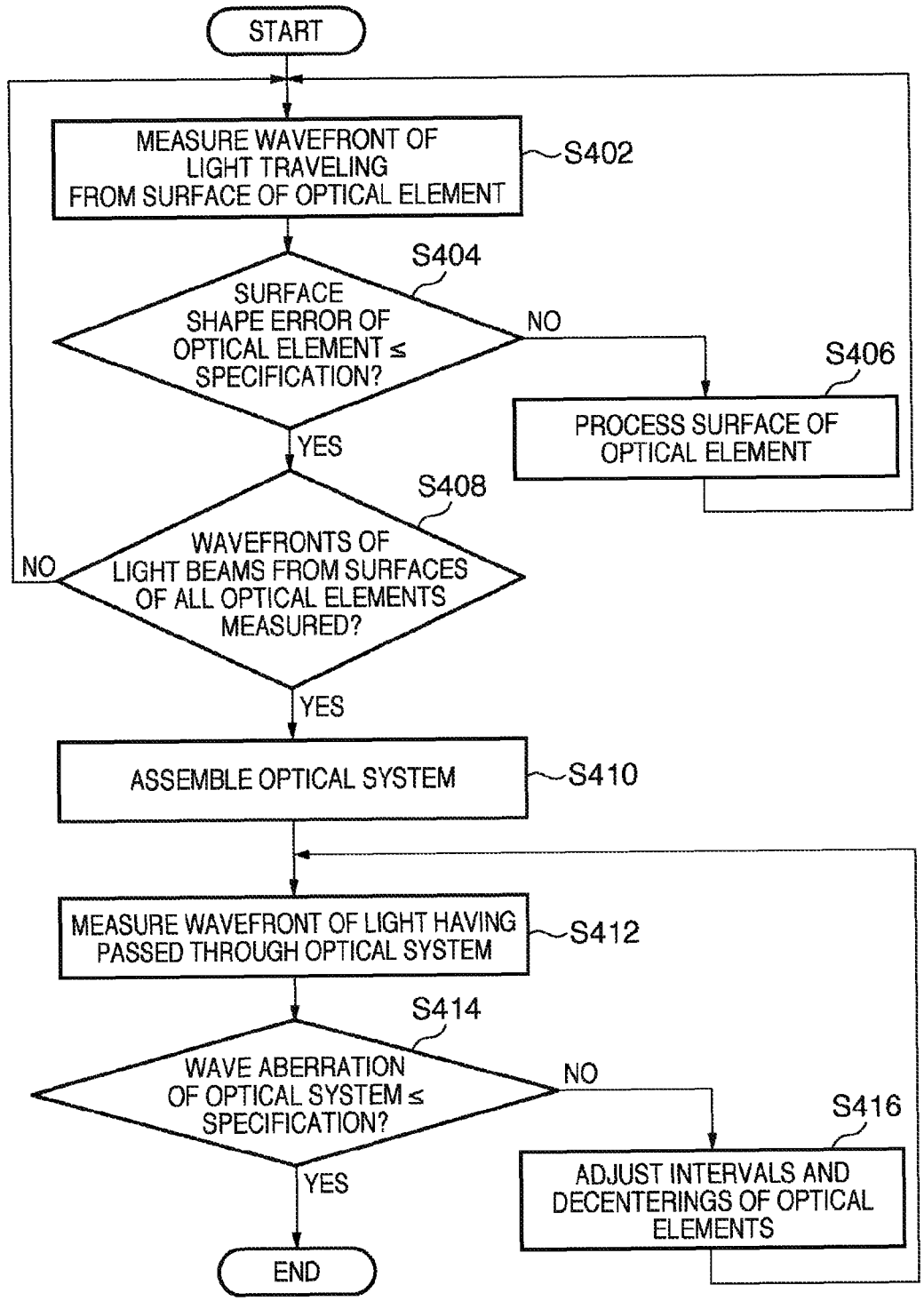

US 8,363,227 B2

MEASUREMENT APPARATUS AND METHOD OF MANUFACTURING OPTICAL SYSTEM

BACKGROUND OF THE INVENTION

1. Field of the Invention

The present invention relates to a measurement apparatus and a method of manufacturing an optical system.

2. Description of the Related Art

An interferometer is used to measure the transmission wavefront or reflection wavefront (optical characteristic) of an optical system. Measurement of the wavefront using an interferometer is important especially for the projection optical system of an exposure apparatus for manufacturing a semiconductor device using photolithography.

To measure and evaluate the surface shape error of an optical element and the transmission wavefront of an optical system at high precision using an interferometer, it is important to separate a wavefront error (so-called system error) unique to (the optical system of) the interferometer and the shape error of a member to be measured (surface to be measured).

For example, a wavefront average method is proposed as a method of separating the system error and the shape error of a member to be measured. According to this method, the wavefront is measured by a plurality of number of times while displacing at random the measurement region of the member to be measured or a Newton gauge surface with respect to the optical axis of the interferometer. There is also proposed a method (to be also referred to as a "rotation shift method"). In the rotation shift method, the wavefront is measured in a plurality of arrangements obtained by rotating and shifting the member to be measured or the Newton gauge surface with respect to the optical axis of the interferometer. Then, the rotation asymmetrical component and rotation symmetrical component are calculated separately. These techniques are disclosed in Japanese Patent Laid-Open No. 5-223537.

In wavefront measurement using an interferometer, if a change of the system error over time is negligibly small with respect to the required measurement precision, the system error is calibrated periodically at a relatively long period. However, if a change of the system error over time cannot be ignored with respect to the required measurement precision or a Fizeau lens which forms part of the optical system of the interferometer needs to be exchanged, the system error has to be calibrated more frequently. In some cases, the system error needs to be calibrated every time the target member is measured.

In system error calibration, the member to be measured or the Newton gauge surface needs to be measured in a plurality of arrangements with respect to the optical axis of the interferometer by the foregoing wavefront average method, rotation shift method, or the like. Hence, frequent calibration of the system error prolongs the time taken to measure one target member, and the member cannot be measured efficiently.

SUMMARY OF THE INVENTION

The present invention provides a technique capable of measuring the wavefront of light traveling from a member to be measured at high precision within a short time.

According to one aspect of the present invention, there is provided a measurement apparatus which measures a wavefront of light traveling from a member to be measured, the apparatus including a first reference surface, a second reference surface configured to function as a reference surface for the first reference surface, an optical system configured to form a first interference pattern of light traveling from the member to be measured and light traveling from the first reference surface, and a second interference pattern of light traveling from the first reference surface and light traveling from the second reference surface, a detection unit configured to detect the first interference pattern and the second interference pattern, respectively, and a calculation unit configured to calculate a change amount of a wavefront of light traveling from the first reference surface based on the second interference pattern detected by the detection unit, when the change amount of the wavefront falls outside an allowable range, calculate a wavefront of light traveling from the member to be measured by removing, from a wavefront calculated based on the first interference pattern, a wavefront error arising from the optical system and the change amount of the wavefront of light traveling from the first reference surface, and when the change amount of the wavefront falls within the allowable range, calculate the wavefront of light traveling from the member to be measured by removing, from the wavefront calculated based on the first interference pattern, the wavefront error arising from the optical system.

Further aspects of the present invention will become apparent from the following description of exemplary embodiments with reference to the attached drawings.

BRIEF DESCRIPTION OF THE DRAWINGS

FIG. 3 is a flowchart for explaining processing of calculating wave aberration of an optical system to be detected by the calculation unit of the measurement apparatus shown in FIG. 2.

FIG. 4 is a flowchart for explaining a method of manufacturing an optical system in the third embodiment of the present invention.

DESCRIPTION OF THE EMBODIMENTS

Figure 1:
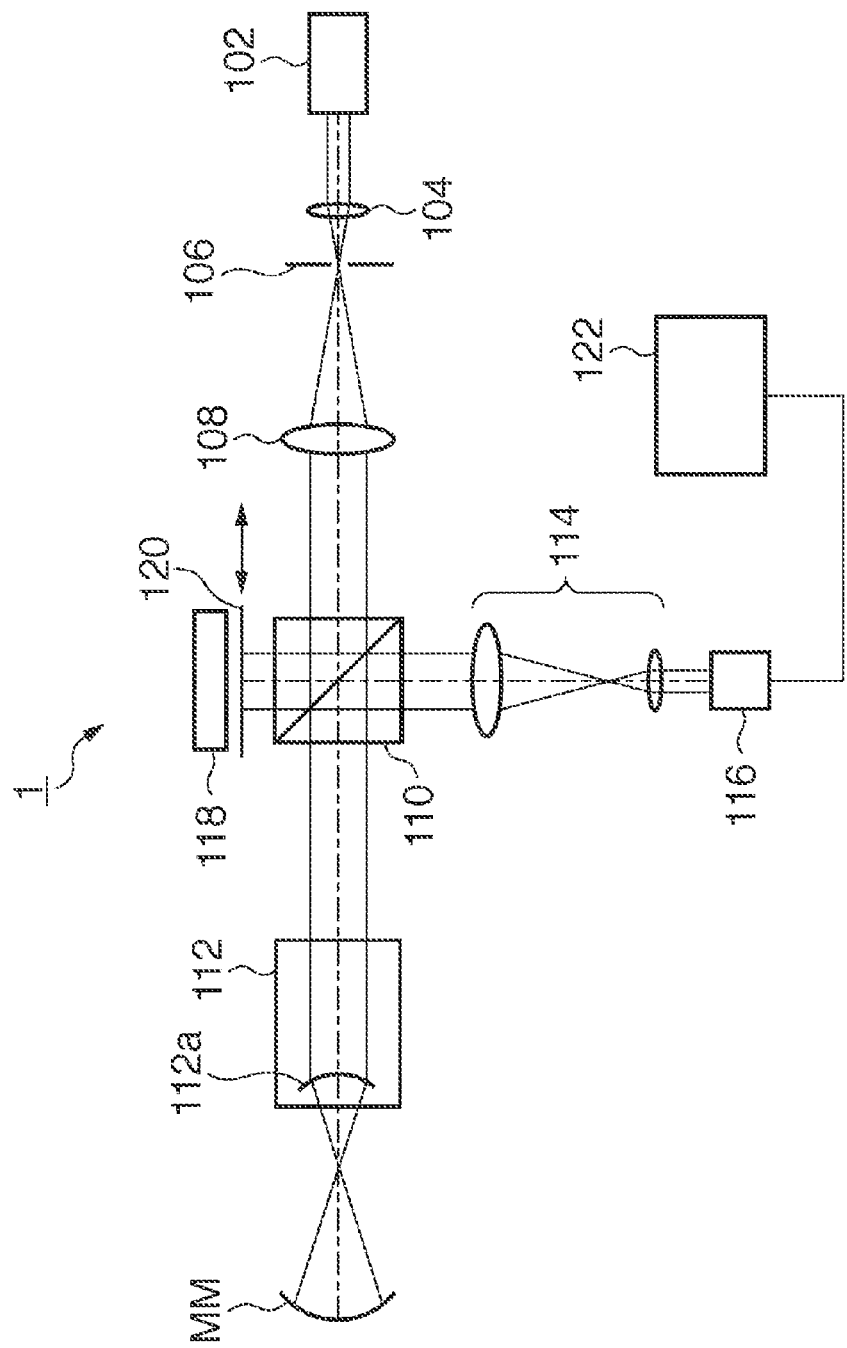
FIG. 1 is a schematic view showing the arrangement of a measurement apparatus in the first embodiment of the present invention.

Preferred embodiments of the present invention will be described below with reference to the accompanying drawings. Note that the same reference numerals denote the same members throughout the drawings, and a repetitive description thereof will not be given.

<First Embodiment>

FIG. 1 is a schematic view showing the arrangement of a measurement apparatus 1 in the first embodiment of the present invention. The measurement apparatus 1 measures the wavefront of light (to be referred to as the "wavefront of a member to be measured") traveling from a member to be measured (surface to be measured), that is, the shape (surface shape) of the member to be measured.

The measurement apparatus 1 basically has a Fizeau interferometer arrangement. More specifically, as shown in FIG. 1, the measurement apparatus 1 includes a light source 102, condenser lens 104, wavefront shaping pinhole 106, collimator lens 108, and beam splitter 110. The measurement apparatus 1 also includes a Fizeau lens 112 having a reference surface (first reference surface) 112a, an imaging optical system 114, a detection unit 116, a reference surface (second reference surface) 118, a light-shielding plate 120, and a calculation unit 122. Note that the reference surface 118 functions as a reference surface for the reference surface 112a. For this purpose, the reference surface 118 is made of a material hardly affected by an environmental change, compared to the reference surface 112a, and is arranged at a position where the reference surface 118 is hardly affected by an environmental change, compared to the reference surface 112a.

First, detection of the interference pattern (first interference pattern) of light reflected by a member MM to be measured and that reflected by the reference surface 112a will be explained. At this time, the light-shielding plate 120 is inserted in the optical path between the beam splitter 110 and the reference surface 118 to prevent light reflected by the beam splitter 110 from reaching the reference surface 118.

The condenser lens 104 condenses light emitted by the light source 102 on the wavefront shaping pinhole 106. The collimator lens 108 collimates the light having passed through the wavefront shaping pinhole 106 into parallel light with a predetermined beam size. The parallel light enters the beam splitter 110. The light having passed through the beam splitter 110 enters the Fizeau lens 112 and is split into light that passes through the reference surface 112a and light that is reflected by it. The light which has passed through the reference surface 112a and is reflected by the member MM to be measured, and that reflected by the reference surface 112a pass again through the Fizeau lens 112, and are reflected by the beam splitter 110. The imaging optical system 114 converts the light beams reflected by the beam splitter 110 (light reflected by the member MM to be measured and that reflected by the reference surface 112a) into ones having a predetermined beam size. The converted light beams enter the detection surface of the detection unit 116.

On the detection surface of the detection unit 116, the interference pattern of the light reflected by the member MM to be measured and that reflected by the reference surface 112a is formed. The detection unit 116 detects the interference pattern. At this time, the Fizeau lens 112 or the member MM to be measured is slightly driven along the optical axis to modulate the phase of the interference pattern, detecting a plurality of interference patterns different in phase modulation amount. The calculation unit 122 receives the interference pattern of the light reflected by the member MM to be measured and that reflected by the reference surface 112a that has been detected by the detection unit 116.

Next, detection of the interference pattern (second interference pattern) of light reflected by the reference surface 112a and that reflected by the reference surface 118 will be explained. At this time, the light-shielding plate 120 is retracted from the optical path between the beam splitter 110 and the reference surface 118 to allow light reflected by the beam splitter 110 to enter the reference surface 118. Note that the reference surface 118 is aligned so that the interference pattern of light reflected by the reference surface 112a and that reflected by the reference surface 118 can be detected on the detection surface of the detection unit 116. The angle of the reference surface 118 with respect to the optical axis of the measurement apparatus 1 is arbitrary as long as the interference pattern of light reflected by the reference surface 112a and that reflected by the reference surface 118 can be detected. The member MM to be measured is arranged at a position where light reflected by the member MM to be measured does not enter the detection surface of the detection unit 116.

Light emitted by the light source 102 enters the beam splitter 110 via the condenser lens 104, wavefront shaping pinhole 106, and collimator lens 108. Part of the light entering the beam splitter 110 passes through the beam splitter 110 and reaches the reference surface 112a of the Fizeau lens 112. The remaining part of the light entering the beam splitter 110 is reflected by the beam splitter 110 and reaches the reference surface 118. Light reflected by the reference surface 112a is reflected by the beam splitter 110 and enters the imaging optical system 114. Light reflected by the reference surface 118 passes through the beam splitter 110 and enters the imaging optical system 114. The imaging optical system 114 converts the light reflected by the reference surface 112a and that reflected by the reference surface 118 into ones having a predetermined beam size. The converted light beams then enter the detection surface of the detection unit 116.

On the detection surface of the detection unit 116, the interference pattern of the light reflected by the reference surface 112a and that reflected by the reference surface 118 is formed. The detection unit 116 detects the interference pattern. At this time, the Fizeau lens 112 or reference surface 118 is slightly driven along the optical axis to modulate the phase of the interference pattern, detecting a plurality of interference patterns different in phase modulation amount. The calculation unit 122 receives the interference pattern of the light reflected by the reference surface 112a and that reflected by the reference surface 118 that has been detected by the detection unit 116.

The calculation unit 122 calculates the wavefront of the member MM to be measured (the shape of the member MM to be measured) using a phase recovery algorithm or the like. In other words, the calculation unit 122 calculates the wavefront of the member MM to be measured, based on the interference pattern of light reflected by the member MM to be measured and that reflected by the reference surface 112a, and the interference pattern of light reflected by the reference surface 112a and that reflected by the reference surface 118.

Processing of calculating the wavefront of the member MM to be measured by the calculation unit 122 will be described in detail. To measure the wavefront of the member MM at high precision, a wavefront error arising from (the optical system of) the measurement apparatus 1 needs to be separated from the shape error of the member MM to be measured. Thus, the calculation unit 122 separates (removes) the wavefront error arising from the measurement apparatus 1, from a wavefront calculated based on the interference pattern of light reflected by the member MM to be measured and that reflected by the reference surface 112a. Note that the wavefront error arising from the measurement apparatus 1 can be calculated by separation calculation using a plurality of patterns detected in a plurality of arrangements obtained by rotating and shifting the member MM to be measured with respect to the optical axis of the measurement apparatus 1. Wsys0 is the wavefront error arising from the measurement apparatus 1.

Also, the calculation unit 122 calculates the wavefront (reference wavefront) of light traveling from the reference surface 112a, based on the interference pattern of light reflected by the reference surface 112a and that reflected by the reference surface 118. Wref0 is the reference wavefront (standard wavefront in standard measurement).

A case wherein the wavefront of another member MM is measured will be examined. In the conventional technique, every time the member MM to be measured is changed, a plurality of interference patterns have to be detected in a plurality of arrangements obtained by rotating and shifting the member MM to be measured with respect to the optical axis of the measurement apparatus 1. Then, separation calculation has to be performed using these interference patterns. Every time the arrangement of the member MM to be measured is changed, (light reflected by) the member MM to be measured is repetitively aligned to detect the interference pattern. When separation calculation is executed every time the member MM to be measured is changed, the wavefront error arising from the measurement apparatus 1 can be separated (removed) at high precision even upon generation of a change ΔWsys of the wavefront error arising from the measurement apparatus 1. However, even if the change ΔWsys of the wavefront error arising from the measurement apparatus 1 is small with respect to the required measurement precision, it cannot be detected before the end of the separation calculation. This leads to redundant measurement. The time taken to measure one member MM becomes long, failing to measure the member MM efficiently.

To solve this problem, in the first embodiment, the interference pattern of light reflected by the reference surface 112a and that reflected by the reference surface 118 is detected. The calculation unit 122 calculates a change amount (difference from the standard wavefront) ΔWref from the reference wavefront Wref0. If the change amount ΔWref falls within the allowable range, the calculation unit 122 separates the wavefront error Wsys0 arising from the measurement apparatus 1, from a wavefront calculated based on the interference pattern of light reflected by the member MM to be measured and that reflected by the reference surface 112a. More specifically, the calculation unit 122 calculates, as a wavefront Wm_sub of the member MM to be measured, a wavefront (first wavefront) obtained by separating the wavefront error Wsys0 from a wavefront Wm calculated based on the interference pattern of light reflected by the member MM to be measured and that reflected by the reference surface 112a in accordance with:

$$Wm\_sub = Wm - Wsys0 \tag{1}$$

When the change amount ΔWref from the reference wavefront Wref0 falls outside the allowable range, the calculation unit 122 calculates the wavefront error change (change amount) ΔWsys corresponding to the change amount ΔWref from the reference wavefront Wref0. The calculation unit 122 separates the wavefront error Wsys0 arising from the measurement apparatus 1, from a wavefront calculated based on the interference pattern of light reflected by the member MM to be measured and that reflected by the reference surface 112a. Further, the calculation unit 122 removes the wavefront error change ΔWsys. More specifically, the calculation unit 122 calculates, as the wavefront Wm_sub of the member MM to be measure, a wavefront obtained by separating the wavefront error Wsys0 and wavefront error change ΔWsys from the wavefront Wm calculated based on the interference pattern of light reflected by the member MM to be measured and that reflected by the reference surface 112a in accordance with:

$$Wm\_sub = Wm - (Wsys0 + \Delta Wsys) \tag{2}$$

Note that the relationship (for example, ΔWsys=α·ΔWref (α: coefficient)) between the change amount ΔWref from the reference wavefront Wref0 and the wavefront error change ΔWsys may be obtained by actual measurement or ray tracing simulation.

In this manner, according to the first embodiment, the wavefront error arising from (the optical system of) the measurement apparatus 1 and the shape error of the member MM to be measured can be separated without rotating or shifting the member MM to be measured with respect to the optical axis of the measurement apparatus 1. Even when the wavefront error arising from the measurement apparatus 1 changes upon a change of the reference surface 112a over time, the measurement apparatus 1 can measure the wavefront of the member MM at high precision within a short time.

<Second Embodiment>

Figure 2:
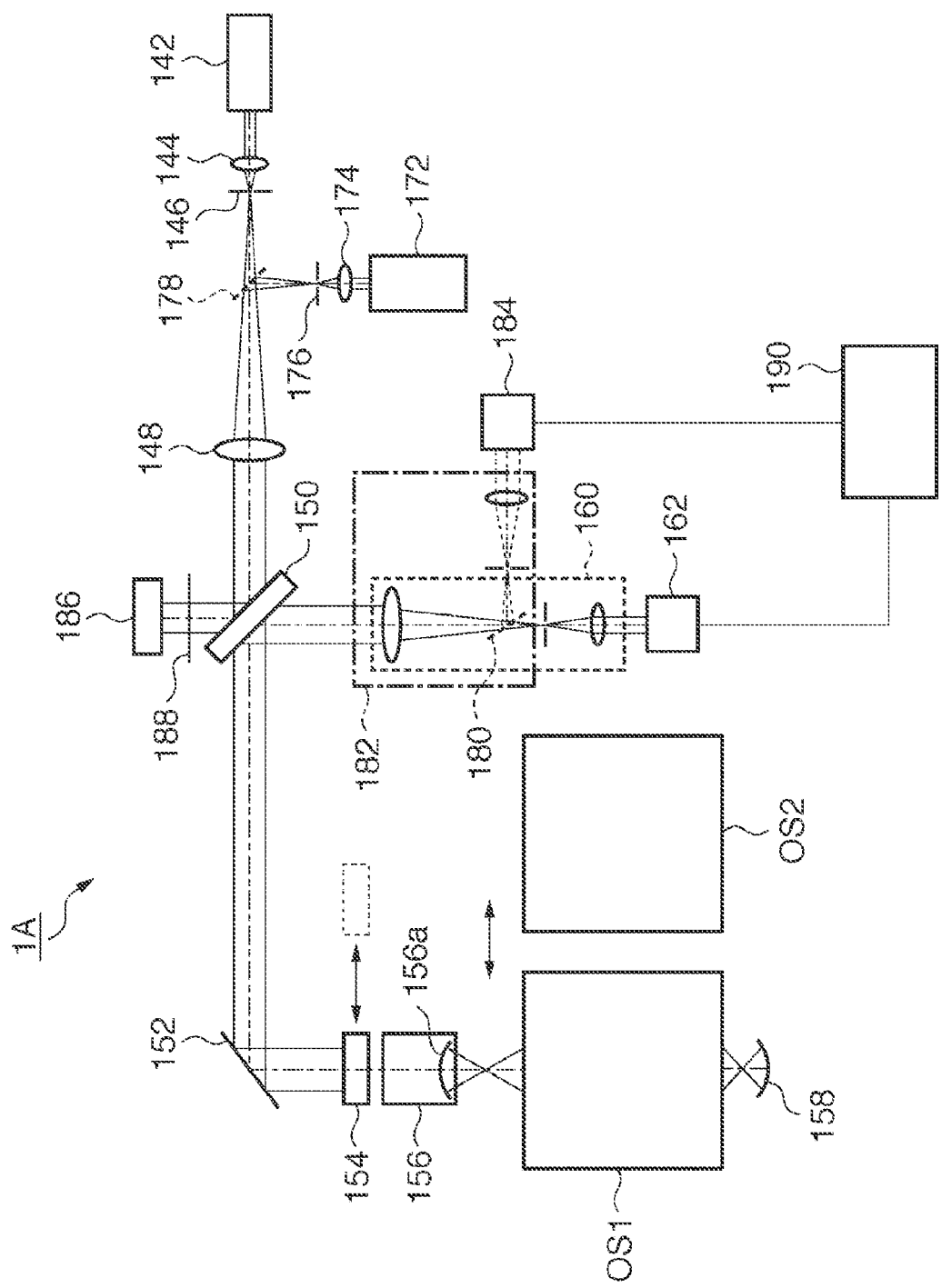
FIG. 2 is a schematic view showing the arrangement of a measurement apparatus in the second embodiment of the present invention.

FIG. 2 is a schematic view showing the arrangement of a measurement apparatus 1A in the second embodiment of the present invention. The measurement apparatus 1A measures the wavefront of light traveling from an optical system (transmission optical system) serving as a member to be measured, that is, wave aberration of the optical system. Note that the measurement apparatus 1A measures a plurality of optical systems having different design wavelengths. The measurement apparatus 1A is formed from optical systems corresponding to beams with a plurality of wavelengths so that it can measure the wave aberrations of the respective optical systems.

The measurement apparatus 1A basically has a Fizeau interferometer arrangement. More specifically, as shown in FIG. 2, the measurement apparatus 1A includes a first light source 142 which emits light (first light) having a wavelength λ1 (first wavelength), a condenser lens 144, a wavefront shaping pinhole 146, a collimator lens 148, and a half mirror 150. The measurement apparatus 1A includes a plane mirror 152, a chromatic aberration correction lens 154, a Fizeau lens 156 having a reference surface (first reference surface) 156a, a spherical mirror 158, an imaging optical system 160, and a first detection unit 162. The measurement apparatus 1A also includes a second light source 172 which emits light (second light) having a wavelength λ2 (second wavelength), a condenser lens 174, a wavefront shaping pinhole 176, optical path switching mirrors 178 and 180, an imaging optical system 182, and a second detection unit 184. Further, the measurement apparatus 1A includes a reference surface (second reference surface) 186, a light-shielding plate 188, and a calculation unit 190. Note that the reference surface 186 functions as a reference surface for the reference surface 156a. For this purpose, the reference surface 186 is made of a material hardly affected by an environmental change, compared to the reference surface 156a, and is arranged at a position where it is hardly affected by an environmental change, compared to the reference surface 156a. In the second embodiment, the wavelengths λ1 and λ2 are VUV wavelengths of 190 nm to 250 nm or UV wavelengths of 350 nm to 370 nm, and are different from each other.

First, measurement of wave aberration of an optical system OS1 to be detected whose design wavelength is the wavelength λ1 will be explained. At this time, the optical system OS1 to be detected is inserted in the optical path between the Fizeau lens 156 and the spherical mirror 158. The light-shielding plate 188 is inserted in the optical path between the half mirror 150 and the reference surface 186 to prevent light reflected by the half mirror 150 from entering the reference surface 186.

The condenser lens 144 designed (optimized) for light with the wavelength λ1 condenses, on the wavefront shaping pinhole 146, light with the wavelength λ1 emitted by the first light source 142. The collimator lens 148 collimates the light having passed through the wavefront shaping pinhole 146 into parallel light with a predetermined beam size. The parallel light enters the half mirror 150.

The light having passed through the half mirror 150 is reflected by the plane mirror 152 and enters the Fizeau lens 156 via the chromatic aberration correction lens 154. In the second embodiment, the Fizeau lens 156 functions as a Fizeau lens for light with the wavelength λ1 in cooperation with the chromatic aberration correction lens 154 for correcting chromatic aberration generated between light with the wavelength λ1 and that with the wavelength λ2. The light entering the Fizeau lens 156 is split into light that passes through the reference surface 156a and light that is reflected by it.

The light having passed through the reference surface 156a passes through the optical system OS1 to be detected, and is reflected by the spherical mirror 158. The light passes again through the optical system OS1 to be detected, and enters the Fizeau lens 156. The light having passed through the optical system OS1 to be detected and that reflected by the reference surface 156a pass through the Fizeau lens 156 and chromatic aberration correction lens 154, and are reflected by the half mirror 150. The light beams reflected by the half mirror 150 (light having passed through the optical system OS1 to be detected and that reflected by the reference surface 156a) enter the detection surface of the first detection unit 162 via the imaging optical system 160. Note that the imaging optical system 160 and first detection unit 162 are designed (optimized) for light with the wavelength $\lambda 1$.

On the detection surface of the first detection unit 162, the interference pattern of the light having passed through the optical system OS1 to be detected and that reflected by the reference surface 156a is formed. The first detection unit 162 detects the interference pattern. At this time, the Fizeau lens 156 is slightly driven along the optical axis to modulate the phase of the interference pattern, detecting a plurality of interference patterns different in phase modulation amount. The interference pattern detected by the first detection unit 162 is sent to the calculation unit 190. The calculation unit 190 calculates the wavefront of light (wave aberration of the optical system OS1 to be detected) traveling from the optical system OS1 to be detected.

Next, measurement of wave aberration of an optical system OS2 to be detected whose design wavelength is the wavelength $\lambda 2$ will be explained. At this time, the optical system OS2 to be detected is inserted in the optical path between the Fizeau lens 156 and the spherical mirror 158. The light-shielding plate 188 is inserted in the optical path between the half mirror 150 and the reference surface 186 to prevent light reflected by the half mirror 150 from reaching the reference surface 186. Further, the optical path switching mirror 178 is inserted in the optical path between the wavefront shaping pinhole 176 and the collimator lens 148. The optical path switching mirror 180 is inserted in the optical path between the half mirror 150 and the first detection unit 162. In the second embodiment, the optical path switching mirrors 178 and 180 are configured so that they can be inserted into and retracted from the optical path. Instead, the optical path switching mirrors 178 and 180 can be replaced with fixed dichroic mirrors. The Fizeau lens 156 functions as a Fizeau lens singly for light with the wavelength $\lambda 2$. The chromatic aberration correction lens 154 is therefore retracted from the optical path between the half mirror 150 and the Fizeau lens 156.

The condenser lens 174 designed (optimized) for light with the wavelength $\lambda 2$ condenses, on the wavefront shaping pinhole 176, light with the wavelength $\lambda 2$ emitted by the second light source 172. The light having passed through the wavefront shaping pinhole 176 is reflected by the optical path switching mirror 178. The collimator lens 148 collimates the reflected light into parallel light with a predetermined beam size. The parallel light arrives the half mirror 150.

The light having passed through the half mirror 150 is reflected by the plane mirror 152, enters the Fizeau lens 156, and is split into light passing through the reference surface 156a and that reflected by it.

The light having passed through the reference surface 156a passes through the optical system OS2 to be detected, and is reflected by the spherical mirror 158. The light passes again through the optical system OS2 to be detected, and enters the Fizeau lens 156. The light having passed through the optical system OS2 to be detected and that reflected by the reference surface 156a pass through the Fizeau lens 156, and are reflected by the half mirror 150. The light beams reflected by the half mirror 150 (light having passed through the optical system OS2 to be detected and that reflected by the reference surface 156a) are reflected by the optical path switching mirror 180, and enter the detection surface of the second detection unit 184 via the imaging optical system 182. Note that the imaging optical system 182 and second detection unit 184 are designed (optimized) for light with the wavelength $\lambda 2$.

On the detection surface of the second detection unit 184, the interference pattern of the light having passed through the optical system OS2 to be detected and that reflected by the reference surface 156a is formed. The second detection unit 184 detects the interference pattern. At this time, the Fizeau lens 156 is slightly driven along the optical axis to modulate the phase of the interference pattern, detecting a plurality of interference patterns different in phase modulation amount. The interference pattern detected by the second detection unit 184 is sent to the calculation unit 190. The calculation unit 190 calculates the wavefront of light (wave aberration of the optical system OS2 to be detected) traveling from the optical system OS2 to be detected.

In the second embodiment, the chromatic aberration correction lens 154 is inserted into or retracted from the optical path in accordance with switching of the light source (that is, change of the optical system to be detected). However, the Fizeau lens 156 itself may be changed, instead of configuring the chromatic aberration correction lens 154 so that it can be inserted into and retracted from the optical path. In place of changing the Fizeau lens 156, the plane mirror 152 may be driven to change the position of light incident on the Fizeau lens 156.

When the state of the Fizeau lens serving as part of the optical system of the measurement apparatus needs to be changed in accordance with change of the optical system to be detected, a change of the wavefront error cannot be detected unless the wavefront error arising from the measurement apparatus is calibrated every time the optical system to be detected is changed. Hence, every time the optical system to be detected is changed, a plurality of interference patterns have to be detected in a plurality of arrangements obtained by rotating and shifting the optical system to be detected with respect to the optical axis of the measurement apparatus. Alternatively, calibration has to be executed using a wavefront error measurement tool instead of the optical system to be detected. As a result, the time taken to measure one optical system to be detected becomes long, failing to efficiently measure the optical system to be detected.

In contrast, the second embodiment achieves efficient measurement of an optical system OS to be detected by detecting, for each of light beams with a plurality of wavelengths, the interference pattern of light reflected by the reference surface 156a and that reflected by the reference surface 186.

Processing of calculating wave aberration of the optical system OS to be detected by the calculation unit 190 will be described in detail with reference to FIG. 3. Note that processing of calculating wave aberration of the optical system OS1 to be detected whose design wavelength is the wavelength $\lambda 1$ is basically the same as processing of calculating wave aberration of the optical system OS2 to be detected whose design wavelength is the wavelength $\lambda 2$. The processing of calculating wave aberration of the optical system OS1 to be detected will be exemplified.

In S302, the calculation unit 190 obtains a wavefront error arising from (the optical system of) the measurement apparatus 1A for light with the wavelength λ1. The wavefront error arising from the measurement apparatus 1A can be obtained (measured) by arranging a wavefront error measurement tool instead of the optical system OS1 to be detected, and detecting an interference pattern. Wsysλ1 is the wavefront error arising from the measurement apparatus 1A for light with the wavelength λ1.

In S304, the calculation unit 190 obtains the wavefront (reference wavefront) of light traveling from the reference surface 156a of the Fizeau lens 156. To obtain the reference wavefront of light traveling from the reference surface 156a of the Fizeau lens 156, the detection unit 162 detects the interference pattern of light reflected by the reference surface 156a and that reflected by the reference surface 186. Thus, the light-shielding plate 188 is retracted from the optical path between the half mirror 150 and the reference surface 186 to allow light reflected by the half mirror 150 to reach the reference surface 186. Note that the reference surface 186 is aligned so that the interference pattern of light reflected by the reference surface 156a and that reflected by the reference surface 186 can be detected on the detection surface of the detection unit 162. The angle of the reference surface 186 with respect to the optical axis of the measurement apparatus 1A is arbitrary as long as the interference pattern of light reflected by the reference surface 156a and that reflected by the reference surface 186 can be detected. Light reflected by the reference surface 186 passes through the half mirror 150, and enters the detection surface of the detection unit 162 via the imaging optical system 160 together with light reflected by the reference surface 156a of the Fizeau lens 156. On the detection surface of the detection unit 162, the interference pattern of the light reflected by the reference surface 156a and that reflected by the reference surface 186 is formed. Similar to the first embodiment, the reference wavefront for light with the wavelength λ1 can be obtained. Wrefλ1 is the reference wavefront for light with the wavelength λ1.

In S306, the calculation unit 190 obtains the interference pattern of light having passed through the optical system OS1 to be detected and that reflected by the reference surface 156a. At this time, the light-shielding plate 188 is inserted into the optical path between the half mirror 150 and the reference surface 186 to prevent light reflected by the half mirror 150 from reaching the reference surface 186, as described above. Also, the optical system OS1 to be detected is interposed between the Fizeau lens 156 and the spherical mirror 158.

In S308, the calculation unit 190 obtains the reference wavefront of light traveling from the reference surface 156a of the Fizeau lens 156 upon obtaining the interference pattern in S306. The calculation unit 190 calculates a change amount ΔWrefλ1 from the reference wavefront Wrefλ1. Note that the reference wavefront of light traveling from the reference surface 156a of the Fizeau lens 156 upon obtaining the interference pattern in S306 can be obtained similarly to S304.

In S310, the calculation unit 190 determines whether the change amount ΔWrefλ1 from the reference wavefront Wrefλ1 that has been calculated in S308 falls within the allowable range. If the change amount ΔWrefλ1 from the reference wavefront Wrefλ1 falls within the allowable range, the process shifts to S312. If the change amount ΔWrefλ1 from the reference wavefront Wrefλ1 does not fall within the allowable range (that is, falls outside the allowable range), the process shifts to S314.

In S312, the calculation unit 190 calculates wave aberration of the optical system OS1 to be detected by separating the wavefront error arising from the measurement apparatus 1A, from a wavefront calculated based on the interference pattern of light having passed through the optical system OS1 to be detected and that reflected by the reference surface 156a. More specifically, the calculation unit 190 calculates, as wave aberration Wos_sub of the optical system OS to be detected, a wavefront obtained by separating the wavefront error Wsysλ1 obtained in S302 from a wavefront Wos calculated based on the interference pattern obtained in S306 in accordance with:

$$Wos\_sub = Wos - Wsys\lambda 1 \quad (3)$$

In S314, the calculation unit 190 calculates the change amount ΔWsysλ1 of the wavefront error arising from the measurement apparatus 1A that corresponds to the change amount ΔWrefλ1 from the reference wavefront Wrefλ1 that has been calculated in S308. Note that the relationship (for example, ΔWsysλ1=β·ΔWrefλ1 (β: coefficient)) between the change amount ΔWrefλ1 from the reference wavefront Wrefλ1 and the wavefront error change amount ΔWsysλ1 may be obtained by actual measurement or ray tracing simulation.

In S316, the calculation unit 190 separates the wavefront error arising from the measurement apparatus 1A, from the wavefront calculated based on the interference pattern of light having passed through the optical system OS1 to be detected and that reflected by the reference surface 156a. Further, the calculation unit 190 removes the wavefront error change amount, calculating wave aberration of the optical system OS1 to be detected. More specifically, the calculation unit 190 calculates, as wave aberration Wos_sub, a wavefront obtained by separating the wavefront error Wsysλ1 obtained in S302 and the wavefront error change amount ΔWsysλ1 calculated in S314 from the wavefront Wos calculated based on the interference pattern obtained in S306 in accordance with:

$$Wos\_sub = Wos - (Wsys\lambda 1 + \Delta Wsys\lambda 1) \quad (4)$$

As described above, according to the second embodiment, when measuring wave aberrations of a plurality of optical systems to be detected with different set wavelengths, the wavefront error arising from the measurement apparatus 1A can be separated while reducing the frequency at which the optical system to be detected is rotated and shifted with respect to the optical axis of the measurement apparatus 1A. Even when the wavefront error arising from the measurement apparatus 1A changes upon a change of the reference surface 156a over time, the measurement apparatus 1A can measure wave aberration of the optical system to be detected at high precision within a short time.

<Third Embodiment>

In the third embodiment, a method of manufacturing an optical system (for example, a projection optical system for projecting a reticle pattern onto a substrate) including a plurality of optical elements such as a lens and mirror will be described with reference to FIG. 4.

In S402, the wavefront of light traveling from the surface of an optical element which forms an optical system is measured using a measurement apparatus 1 described in the first embodiment. In S404, it is determined based on the measurement result in S402 (that is, the wavefront of light traveling from the surface of the optical element that has been measured in S402), whether the surface shape error of the optical element is equal to or smaller than a specification. If the surface shape error of the optical element is larger than the specification, the surface of the optical element is processed in S406 so that the surface shape error of the optical element becomes equal to or smaller than the specification. After that, the process shifts to S402 in order to measure the wavefront of light traveling from the processed surface of the optical element. In this fashion, the surface of the optical element is processed until the surface shape error of the optical element becomes equal to or smaller than the specification. If the surface shape error of the optical element is equal to or smaller than the specification, it is determined in S408 whether the wavefronts of light beams traveling from the surfaces of all optical elements which form the optical system have been measured. If NO in S408, the process shifts to S402 in order to measure the wavefront of light traveling from the surface of the next optical element. If YES in S408, the optical system is assembled in S410 using a plurality of optical elements (that is, optical elements whose surface shape errors are equal to or smaller than the specification).

In S412, the wavefront of light having passed through the optical system assembled in S410 is measured using a measurement apparatus 1A described in the second embodiment. In S414, it is determined based on the measurement result in S412 (that is, the wavefront of light having passed through the optical system that has been measured in S412), whether wave aberration of the optical system assembled in S410 is equal to or smaller than a specification. If wave aberration of the optical system is equal to or smaller than the specification, the process ends. If wave aberration of the optical system is larger than the specification, the intervals and decenterings of the optical elements which form the optical system are adjusted in S416 so that wave aberration of the optical system becomes equal to or smaller than the specification. The process shifts to S412 in order to measure the wavefront of light traveling from the adjusted optical system. The optical system is adjusted until wave aberration of the optical system becomes equal to or smaller than the specification.

In the third embodiment, the surface shape of an optical element which forms an optical system, and wave aberration of the optical system can be measured at high precision within a short time using the measurement apparatuses 1 and 1A described in the first and second embodiments. A high-performance optical system can therefore be manufactured within a short time.

In the above-described embodiments, it is determined whether the change amount of the reference wavefront falls within the allowable range. It may be determined whether the change amount of the wavefront error arising from the measurement apparatus that corresponds to the change amount of the reference wavefront falls within the allowable range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2009-167261 filed on Jul. 15, 2009, which is hereby incorporated by reference herein in its entirety.

What is claimed is:

1. A measurement apparatus which measures a wavefront of light traveling from a member to be measured, the apparatus comprising:
a first reference surface;
a second reference surface configured to function as a reference surface for said first reference surface;
an optical system configured to form a first interference pattern of light traveling from the member to be measured and light traveling from said first reference surface, and a second interference pattern of light traveling from said first reference surface and light traveling from said second reference surface;
a detection unit configured to detect the first interference pattern and the second interference pattern, respectively; and
a calculation unit configured to calculate a change amount of a wavefront of light traveling from said first reference surface based on the second interference pattern detected by said detection unit, when the change amount of the wavefront falls outside an allowable range, calculate a wavefront of light traveling from the member to be measured by removing, from a wavefront calculated based on the first interference pattern, a wavefront error arising from said optical system and the change amount of the wavefront of light traveling from said first reference surface, and when the change amount of the wavefront falls within the allowable range, calculate the wavefront of light traveling from the member to be measured by removing, from the wavefront calculated based on the first interference pattern, the wavefront error arising from said optical system.

2. The apparatus according to claim 1, wherein the change amount of the wavefront of light traveling from said first reference surface is a difference between a standard wavefront of light traveling from said first reference surface in standard measurement, and the wavefront of light traveling from said first reference surface that has been calculated from the second interference pattern.

3. The apparatus according to claim 1, further comprising:
a light source configured to emit, toward the member to be measured, first light having a first wavelength and second light having a second wavelength different from the first wavelength; and
a correction lens configured to correct chromatic aberration generated between the first light and the second light, said correction lens being arranged to be able to be inserted into an optical path between said first reference surface and said light source and retracted from the optical path,
wherein every time said correction lens is inserted into the optical path or retracted from the optical path, said calculation unit calculates the change amount of the wavefront of light traveling from said first reference surface.

4. The apparatus according to claim 1, wherein the member to be measured is a transmission optical system.

5. A method of manufacturing an optical system including a plurality of optical elements, the method comprising the steps of:
measuring a wavefront of light traveling from a surface of each of the plurality of optical elements by using a measurement apparatus;
processing the surface of each of the plurality of optical elements based on a result of measurement in the measuring step until a surface shape error of each of the plurality of optical elements becomes not larger than a specification; and
assembling the optical system using the plurality of optical elements processed in the processing step,
the measurement apparatus including:
a first reference surface;
a second reference surface configured to function as a reference surface for the first reference surface;
an imaging optical system configured to form a first interference pattern of light traveling from the surface of each of the plurality of optical elements and light traveling from the first reference surface, and a second interference pattern of light traveling from the first reference surface and light traveling from the second reference surface;

a detection unit configured to detect the first interference pattern and the second interference pattern, respectively; and a calculation unit configured to calculate a change amount of a wavefront of light traveling from the first reference surface based on the second interference pattern detected by the detection unit, when the change amount of the wavefront falls outside an allowable range, calculate a wavefront of light traveling from the surface of each of the plurality of optical elements by removing, from a wavefront calculated based on the first interference pattern, a wavefront error arising from the imaging optical system and the change amount of the wavefront of light traveling from the first reference surface, and when the change amount of the wavefront falls within the allowable range, calculate the wavefront of light traveling from the surface of each of the plurality of optical elements by removing, from the wavefront calculated based on the first interference pattern, the wavefront error arising from the imaging optical system.

6. A method of manufacturing an optical system including a plurality of optical elements, the method comprising the steps of:

measuring a wavefront of light having passed through the optical system including the plurality of optical elements by using a measurement apparatus; and adjusting intervals and decenterings of the plurality of optical elements based on a result of measurement in the measuring step until wave aberration of the optical system becomes not larger than a specification, the measurement apparatus including:

a first reference surface;

a second reference surface configured to function as a reference surface for the first reference surface;

an imaging optical system configured to form a first interference pattern of light traveling from the optical system and light traveling from the first reference surface, and a second interference pattern of light traveling from the first reference surface and light traveling from the second reference surface;

a detection unit configured to detect the first interference pattern and the second interference pattern, respectively; and a calculation unit configured to calculate a change amount of a wavefront of light traveling from the first reference surface based on the second interference pattern detected by the detection unit, when the change amount of the wavefront falls outside an allowable range, calculate a wavefront of light traveling from the optical system by removing, from a wavefront calculated based on the first interference pattern, a wavefront error arising from the imaging optical system and the change amount of the wavefront of light traveling from the first reference surface, and when the change amount of the wavefront falls within the allowable range, calculate the wavefront of light traveling from the optical system by removing, from the wavefront calculated based on the first interference pattern, the wavefront error arising from the imaging optical system.

* * * * *